3,399,991
FREEZE-RESISTANT PESTICIDAL COMPOSITION

Clarence A. Littler, Wilmington, Del., assignor to E. I. du Pont de Nemours and Company, Wilmington, Del., a corporation of Delaware
No Drawing. Filed May 5, 1964, Ser. No. 365,191
4 Claims. (Cl. 71—120)

This invention relates to freeze-resistant pesticidal suspension concentrates.

More particularly, it refers to a freeze and claying resistant pesticidal composition comprising 20 to 50% by weight of a pulverulent, solid, carrier-insoluble pesticide, 0.15 to 1.5% by weight of a low viscosity methyl cellulose, 0.1 to 2.5% by weight of polyvinyl alcohol, partially desulfonated lignin sulfonate or polymerized alkylaryl sulfonate, and from 46 to 79.8% by weight of an aqueous solution of ethylene glycol or propylene glycol in which the glycol:water weight ratio will range from 2:1 to 1:2.5.

It is common for pesticidal suspension concentrates to remain in storage for long periods of time prior to their being used. During such storage it is also common for the solid ingredients to settle out to form packed, hard, clay-like layers at the bottom of the containers. These layers are extremely difficult to resuspend. Unless such claying is prevented it becomes economically unfeasible to use the concentrate after extended storage.

It is also important to formulate pesticidal suspension concentrates so that they are resistant to the effects of low temperature in storage, i.e., freeze resistant. Therefore, the pesticide industry has long sought a freeze-resistant concentrate which does not settle out to form a solid clay upon standing. All sorts of combinations of ingredients have been tried in order to produce a practical freeze-resistant pesticidal suspension concentrate having anti-claying characteristics. These attempts have met with failure mostly because conventional anti-claying agents do not give operable formulations in glycol-water mixes. It is self-evident that an almost infinite number of combinations would have to be tried among the large groups of ingredients available to the formulator of pesticides to find suitable formulations to meet the desired goal.

I have discovered a concentrate which solves the problem by providing a satisfactory freeze-resistant mix that will not form clay-like layers of settled solids for extremely long periods of time.

In U.S. Patent 3,060,084 a non-claying formulation is prepared in a common water mix by combining a water-insoluble pesticide with a carboxylated hydrocarbon polymer suspending agent and a carefully selected dispersing agent. This mix is then subjected to high shear. The dispersant used in this formulation is illustrated by low viscosity methyl cellulose or polyvinyl alcohol. Low viscosity methyl cellulose and polyvinyl alcohol were used in this patent as dispersants. It is recognized in the art that dispersants do not prevent claying. On the contrary, a material which promotes dispersion will aggravate the problem with respect to the formation of clay-like layers, since well-dispersed particles settle slowly into a densely packed bed from which they are difficult to redisperse, i.e. resuspend. In U.S. Patent 3,060,084 the inventor overcame the claying problem by adding a specific suspending agent and subjecting the mixture to high shear.

In the present invention, quite contrary to expectations and past knowledge and understanding in the art, methyl cellulose prevents the formation of tight cakelike deposits. This perhaps occurs because of the unique characteristics of the water-ethylene glycol mix. However, the exact reason for the methyl cellulose to act in this way is not clearly understood.

The pesticides used in the composition of my invention can be any pulverulent solid, material which has a solubility of less than about 0.1% to 0.2% in the glycol-water carrier liquid. Typical of the herbicides that can be used in the composition of my invention are the following:

3-(p-chlorophenyl)-1,1-dimethylurea
3-(3,4-dichlorophenyl)-1,1-dimethylurea
3-(3,4-dibromophenyl)-1,1-dimethylurea
3-(3,4-dichlorophenyl)-1-methylurea
3-(p-chlorophenyl)-1-methylurea
3-(p-chlorophenyl)-1-methyl-1-isopropylurea
3-(p-chlorophenyl)-1-methyl-1-allylurea
3-(m-chlorophenyl)-1,1-dimethylurea
3-(3,4-dichlorophenyl)-1-methyl-1-isopropylurea
3-(3,4-dichlorophenyl)-1-methyl-1-butylurea
3-(3,4-dichlorophenyl)-1-methyl-1-sec.butylurea
3-(p-chlorophenyl)-1-methyl-1-ethylurea
3-(p-bromophenyl)-1,1-dimethylurea
3-(p-fluorophenyl)-1,1-dimethylurea
3-(p-chlorophenyl)-1-methyl-1-n-propylurea
3-(p-chlorophenyl)-1-methyl-1-sec.butylurea
3-(p-iodophenyl)-1,1-dimethylurea
3-(3,4-dichlorophenyl)-1-methyl-1-ethylurea
3-(3-bromo-4-chlorophenyl)-1,1-dimethylurea
3-(2,4,5-trichlorophenyl)-1-methylurea
3-(p-bromophenyl)-1-methyl-1-isopropylurea
3-(p-chlorophenyl)-1,1-diethylurea
3-(2,4,5-trichlorophenyl)-1,1-dimethylurea
3-(m-chlorophenyl)-1-methylurea
3-(p-bromophenyl)-1-methylurea
3-(p-chlorophenyl)-1-ethylurea
3-(m-chlorophenyl)-1-methyl-1-isopropylurea
3-(3,4-dichlorophenyl)-1-methoxy-1-methylurea
3-(3,4-dichlorophenyl)-1-ethoxy-1-methylurea
3-(3,4-dichlorophenyl)-1-propoxy-1-methylurea
3-(3,4-dichlorophenyl)-1-methoxy-1-ethylurea
3-(3,4-dichlorophenyl)-1-methoxy-1-propylurea
3-(4-chlorophenyl)-1-methoxy-1-methylurea
3-(4-bromophenyl)-1-methoxy-1-methylurea
3-(3,4-dibromophenyl)-1-methoxy-1-methylurea
3-(3-bromo-4-methylphenyl)-1-methoxy-1-methylurea
2,4-bis(methylamino)-6-chloro-1,3,5-triazine
2,4-bis(ethylamino)-6-chloro-1,3,5-triazine
2,4-bis(propylamino)-6-chloro-1,3,5-triazine
2-chloro-4-isopropylamino-6-methylamino-1,3,5-triazine
2,4-bis(2-methoxyethylamino)-6-chloro-1,3,5-triazine
2,4-bis(3-methoxypropylamino)-6-chloro-1,3,5-triazine
2-chloro-4-(2-methoxyethylamino)-6-(3-methoxypropylamino)-1,3,5-triazine
2-chloro-4-ethylamino-6-(3-methoxypropylamino)-1,3,5-triazine
3-amino-2,5-dichlorobenzoic acid
2-methoxy-3,6-dichlorobenzoic acid
2,3,6-trichlorobenzoic acid
dimethyl 2,3,5,6-tetrachloroterephthalate
2,6-dichlorobenzonitrile
N-(3,4-dichlorophenyl)-methacrylamide
N,N-dimethyl-2,2-diphenylacetamide
2,3,6-trichlorophenylacetic acid
1-(tetrahydro dicyclopentadienyl)-3,3-dimethylurea
3-(1-ethylpropyl)-6-methyluracil
3-cyclohexyl-5,6-trimethylene uracil
3-isopropyl-6-methyluracil
3-sec-butyl-6-methyluracil
isopropyl-N-phenylcarbamate
isopropyl-N-(3-chlorophenyl)carbamate
3',4'-dichlorophenylpropionanilide
methyl N-(3,4-dichlorophenyl)carbamate.

Suitable fungicides for use in my composition are: known tetraalkyl thiuram disulfides, such as bis(dimethylthiocarbamyl)disulfide, dithiocarbamates such as manganese or zinc ethylenebisdithiocarbamate, ferric, zinc, manganese and other heavy metal salts of dimethyldithiocarbamic acid and ethylmethyldithiocarbamic acid, n-butyldithiocarbamic acid and other dithiocarbamic acids derived from primary and secondary amines, derivatives of rhodanine, such as 3-(p-chlorophenyl)-5-methylrhodanine,
N-trichloromethylmercapto-4-cyclohexene-1,2-dicarboximide (captan),
N-trichloromethylmercaptophthalimide ("Phaltan"),
ethyl mercury p-toluenesulfonanilide,
2,3-dichloro-1,4-naphthoquinone,
tetrachloro-p-benzoquinone,
2,4-dichloro-6-(chloroanilino)-triazine and copper quinolinate,
insoluble inorganic fungicides such as copper oxide and copper oxychloride,
1,4-dichloro-2,5-dimethoxybenzene.

Typical of the insecticides than can be used in my composition are:

dieldrin (1,2,3,4,10,10-hexachloro-6,7-epoxy-1,4,4a,5,6,7,8,8a-octahydro-1,4,5,8-dimethanonaphthalene),
aldrin (1,2,3,4,10,10-hexachloro-1,4,4,5,8,8a-hexahydro-1,4-endoexo-5,8-dimethanonaphthalene),
chlordane (1,2,4,5,6,7,8,8-octachloro-3a,4,7,7a-tetrahydro-4,7-methanoindane),
1,1,1-trichloro-2,2-bis(p-chlorophenyl)ethane,
endrin (1,2,3,4,10,10-hexachloro-6,7-epoxy-1,4,4a,5,6,7,8,8a-octahydro-1,4-endo,endo-5,6-dimethanonaphthalene),
Guthion® (O,O-dimethyl-S[4-oxo-1,2,3-benzotriazin-3-(4H)-yl-methyl]phosphorodithioate),
heptachlor (1,4,5,6,7,8,8-heptachloro-3a,4,7,7a-tetrahydro-4,7-methanoindane),
1,1,1-trichloro-2,2-bis(p-methoxyphenyl)ethane,
1-naphthyl-N-methylcarbamate,
1,1-dichloro-2,2-bis(p-chlorophenyl)ethane,
Telodrin® (1,3,4,5,6,7,8,8-octachloro-3a,4,7,7a-tetrahydro-4,7-methanophthalan),
toxaphene,
Fectran (4-[N,N-dimethylamino]-3,5-xylyl-N-methylcarbamate),
p-chlorobenzyl p-chlorophenyl sulfide,
1,1-bis(p-chlorophenyl)ethanol,
1,1-bis(4-chlorophenyl)-2,2,2-trichloroethanol,
2-sec.butyl-4,6-dinitrophenyl-3,3-dimethylacrylate,
p-chlorophenyl phenyl sulfone and sulfur.

The pesticide will be present in the composition of my invention in the range of 20 to 50% by weight based on the total weight of the concentrate. They will normally be ground to an average size of less than 5 to 10 microns.

The low viscosity methyl cellulose of my invention is a cellulose polymer in which part of the hydroxyl unit in the cellulose has been replaced by a methoxy group. It is also possible to substitute propylene oxides in order to introduce a small percentage of hydroxypropoxyl substitution in addition to the methoxy group. These make possible a range of varying thermal gel temperatures. A range of viscosities is achieved by controlling the chain length during manufacture. For the purpose of this invention all grades and viscosities appear to function interchangeably except for the amount needed to give a desired viscosity. The presence or absence of the propylene glycol ether substituent does not affect the result. It is necessary to use less of the higher viscosity members to give a product with the desired viscosity characteristics.

Low viscosity cellulose is preferred because it can be readily used in the procedures of my invention. Higher viscosity grades of methyl cellulose form such high viscosity aqueous solutions that some mixes become too thick to readily incorporate with the main suspensions.

The viscosity of the methyl cellulose used in my invention will range from 15 to 1500 c.p.s. at 2% concentration in water.

The methyl cellulose used in invention will be present in the total concentrate in a range of 0.15 to 1.5% by weight.

One or more surfactants can be used in my invention. They can be any of polyvinyl alcohol, partially desulfonated lignin sulfonate and polymerized alkylaryl sulfonate. Surfactant will be present in the total concentrate in a range of 0.1 to 2.5% by weight. The use of polyvinyl alcohol is preferred since polyvinyl alcohol often provides the additional benefit of inhibiting crystal growth of the particles of pesticide in the suspension concentrates of this invention.

Ethylene glycol or propylene glycol is present in the composition of this invention, of course, to produce antifreeze properties in water. Normally the amount of glycol:water will be in the range of 2:1 to 1:2.5 to get desirable freeze resistance.

Propylene glycol is preferred in the formulation of my invention because of its non-toxic characteristics. The total amount of water and glycol in my concentrate will range from 34 to 76% by weight.

The compositions of this invention are prepared by mixing the ingredients and subjecting the mixture to high shearing forces to reduce the particle size of the active component. Unlike U.S. Patent 3,060,084 where high shear had an important effect upon the anti-claying agent, there is no such action in this invention. Like results can be obtained without high shear by dissolving the methyl cellulose separately in a portion of the carrier liquid and adding it to the mixture after the grinding step.

The amount of grinding required is dependent upon the brittleness of the active material and its particle size at the time the liquid pre-mix is made. This specific amount will be known to an expert in the art. A particularly advantageous method of grinding the mixture is sand-grinding or ball milling.

Grinding time can be greatly reduced by premicropulverizing or pre-micronizing the solid pesticide. A brittle solid which grinds readily can be very finely reduced in an air-attrition mill before adding to the liquid medium. However, additional shear is required to deagglomerate the aggregates present and to obtain intimate blending and wetting. Shear of this magnitude can be obtained with the colloid mill such as the Charlotte or Marco mill. Softer, waxier solids such as DDT, methoxychlor or linuron require the greater shearing action of a sand mill to complete the combining step.

Compositions of this invention in which the pesticidal component is linuron, 3-(3,4-dichlorophenyl)-1-methoxy-1-methylurea and include polyvinyl alcohol are very much preferred. Such linuron suspensions comprise 25–45% linuron, 0.5–1.5% methyl cellulose and 0.5–1.5% polyvinyl alcohol, in a carrier made up of approximately equal parts of propylene glycol and water. For added dispersant power these compositions may additionally contain from 0.05 to 0.2% of a partially desulfonated lignosulfonate. They are outstanding in their storage stability and freedom from claying in storage. These compositions also have outstanding handling characteristics which makes it easy for the applicator to dilute the concentrate with water in a spray tank and obtain with minimum agitation a highly dispersed, easily applied, slow settling herbicide spray which can be accurately applied to agricultural fields without fear of nozzle pluggage, settling during spraying and the like.

In order to better understand this invention the following examples are provided in addition to those set forth above.

EXAMPLE 1

| | Percent |
|---|---|
| Tech. linuron, 3-(3,4-dichlorophenyl)-1-methoxy-1-methylurea | 43.00 |
| Low viscosity methyl cellulose "Methocel" 15 MC | 1.00 |
| Low viscosity polyvinyl alcohol "Elvanol" 51-05 | 1.00 |
| Ethylene glycol | 27.45 |
| Water | 27.45 |
| Defoamer "Hodag" DV-45B | 0.10 |

The above components are mixed together by first blending micropulverized linuron, methyl cellulose and polyvinyl alcohol while in the dry state to avoid the formation of gelled lumps of the surfactants upon addition to the liquid phase. This powder is then added to the mixed glycol-water. Defoamer is added last and the complete mixture is sand ground until substantially all particles are below 10 microns. The initial viscosity of the product is 345 cps., Brookfield, 30 r.p.m., #2 spindle and 620 cps., Brookfield, 6 r.p.m., #2 spindle.

EXAMPLE 2

| | Percent |
|---|---|
| 3 - (3,4 - dichlorophenyl) - 1 - methoxy-1-methylurea | 36.50 |
| Low viscosity methyl cellulose "Methocel" 15MC | 1.00 |
| Low viscosity polyvinyl alcohol "Elvanol" 51-05 | 1.00 |
| Partially desulfonated sodium lignin sulfonate | 0.18 |
| Tetramethyl thiuram disulfide (preservative) | 0.30 |
| Propylene glycol | 30.46 |
| Water | 30.46 |
| Defoamer "Hodag" DV-45B | 0.10 |

The methyl cellulose, polyvinyl alcohol and sodium lignin sulfonate are first dispersed in the propylene glycol with stirring since they are substantially insoluble in this solvent and will disperse without forming gelled lumps. The linuron, water and defoamer are then added in that order and the total premix is sand milled until substantially all particles are less than 10 microns. The viscosity is 675 cps. when first made but decreases slowly with time. If agitated and pumped while aging the viscosity may drop below 250 cps. but no settling or "claying" out occurs even after extended storage periods.

EXAMPLE 3

| | Percent |
|---|---|
| 3 - (3, 4 - dichlorophenyl) - 1 - methoxy - 1-methylurea | 36.50 |
| High viscosity methyl cellulose "Methocel" 4000 90 HG | 0.25 |
| Low viscosity polyvinyl alcohol "Elvanol" 51-05 | 1.00 |
| Partially desulfonated sodium lignin sulfonate | 0.18 |
| Tetramethyl thiuram disulfide | 0.30 |
| Propylene glycol | 30.835 |
| Water | 30.835 |
| Defoamer "Hodag" PV-45B | 0.10 |

Mixing and grinding are carried out in the same manner as described in Example 2. The product has an initial viscosity of 730 cps., Brookfield 30 r.p.m., #2 spindle and again slowly decreases in viscosity upon aging.

EXAMPLE 4

Mix 1

| | Parts |
|---|---|
| Tech. linuron, 3-(3,4-dichlorophenyl)-1-methoxy-1-methylurea | 36.50 |
| Low viscosity polyvinyl alcohol | 1.00 |
| Low viscosity methyl cellulose | 0.33 |
| Partially desulfonated sodium lignin sulfonate | 0.18 |
| Propylene glycol | 30.46 |
| Water | 24.46 |
| Defoamer | 0.10 |

Mix 2

| | |
|---|---|
| Low viscosity methyl cellulose | 0.67 |
| Water | 6.00 |

Mix 1 is prepared by first adding polyvinyl alcohol, methyl cellulose and sodium lignin sulfonate to the propylene glycol and agitating; then adding linuron, water and defoamer in that order. The mix is then sand ground until substantially all particles are below 10 microns.

Mix 2 is prepared separately by adding the methyl cellulose to hot water and agitating. As the mix cools the methyl cellulose dissolves.

Mix 2 is then stirred into Mix 1 to complete the formulation.

An advantage of this method of preparation is that lower viscosity and better handling characteristics exist during the sand milling step.

EXAMPLE 5

| | Percent |
|---|---|
| 3-(p-chloro)-1,1-dimethylurea | 43.00 |
| Low viscosity methyl cellulose | 1.00 |
| Low viscosity polyvinyl alcohol | 1.00 |
| Ethylene glycol | 27.45 |
| Water | 27.45 |
| Defoamer (n-octyl alcohol) | 0.10 |

This mix is prepared in the same manner as Example 2 and sand milled.

EXAMPLES 6-12

A like amount by weight of the following pesticides are substituted one at a time for the 3-(p-chlorophenyl)-1,1-dimethylurea of Example 5. They are formulated in like manner and the resulting mix has like anti-settling characteristics.

(6) diuron, 3-(3,4-dichlorophenyl)-1,1-dimethylurea
(7) neburon, 3-(3,4-dichlorophenyl)-1-methyl-1-n-butylurea
(8) atrazine, 2-chloro-4-ethylamino-6-isopropylamino-s-triazine
(9, 10, 11) simazine:
    (9) 2-chloro-4,6-bis(ethylamino)-s-triazine
    (10) 3-sec-butyl-5-bromo-6-methyluracil
    (11) 3-phenyl-5-bromo-5-methyluracil
(12) maneb, manganese ethylenebisdithiocarbamate

EXAMPLE 13

| | Percent |
|---|---|
| 2 - methylthio - 4 - ethylamino - 6-isopropylamino-s-triazine | 35.00 |
| Low viscosity methyl cellulose | 0.75 |
| Low viscosity polyvinyl alcohol | 1.00 |
| Partially desulfonated sodium lignin sulfonate | 0.10 |
| An equal weight mixture of water and propylene glycol | 62.75 |
| Defoamer "Hodag" PV-45B | 0.10 |
| Tetramethylthiuram disulfide | 0.30 |

The methyl cellulose, polyvinyl alcohol and sodium lignin sulfonate are preferably dry blended with the powdered active ingredient before mixing with the carrier liquid containing the defoamer and tetramethylthiuram disulfide. The mixture is then sand ground or pebble milled until the desired particle size of the active ingredient is attained, usually until substantially all particles are below 10 microns.

EXAMPLES 14-17

A like amount by weight of the following pesticides are substituted one at a time for the 2-methylthio-4-ethylamino-6-isopropylamino-s-triazine of Example 13. They are formulated in like manner and the resulting mix has like anti-settling characteristics.

(14) 3-[5-(3a,4,5,6,7,7a-hexahydro-4,7-methaniondanyl)]-1,1-dimethylurea
(15) 1-naphthyl-N-methylcarbamate
(16) 3-cyclohexyl-5,6-trimethyleneuracil
(17) 2,2-bis(p-methoxyphenyl)-1,1,1-trichloroethane

The invention claimed is:
1. A pesticidal composition resistant to claying comprising 20 to 50% by weight of a pulverulent solid carrier-insoluble pesticide; 0.15 to 1.5% by weight of low viscosity methyl cellulose having a viscosity from 15 to 1500 cps. at 2% concentration in water; 0.1 to 2.5% by weight of surfactants selected from the group consisting of polyvinyl alcohol, partially desulfonated lignin sulfonate and polymerized alkylaryl sulfonate; 16 to 36% by weight of a glycol selected from the group consisting of ethylene glycol and propylene glycol; and 18 to 40% by weight of water.
2. The composition according to claim 1 wherein the pesticide is 3-(3,4-dichlorophenyl)-1-methyl-1-methoxyurea.
3. The composition according to claim 1 wherein the glycol is propylene glycol.
4. A composition consisting of 36.5% by weight of 3-(3,4-dichlorophenyl)-1-methoxy-1-methylurea, 1% by weight of low viscosity methyl cellulose having a viscosity from 15 to 1500 cps. at 2% concentration in water, 1% by weight of low viscosity polyvinyl alcohol, 0.18% by weight of partially desulfonated sodium lignin sulfonate, 0.3% by weight of tetramethyl thiuram disulfide, 30 to 31% by weight of propylene glycol, 30 to 31% by weight of water and 0.1% by weight of defoamer.

References Cited
UNITED STATES PATENTS

| | | | |
|---|---|---|---|
| 3,060,084 | 10/1962 | Littler | 167—42 |
| 3,192,104 | 6/1965 | Baker | 167—42 |

OTHER REFERENCES

The Merck Index of Chemicals and Drugs, Merck and Co., Inc., Seventh Edition, Rahway, N.J., 1960, p. 863.

ALBERT T. MEYERS, *Primary Examiner.*

J. D. GOLDBERG, *Assistant Examiner.*